United States Patent [19]

Jakuba

[11] 4,429,532
[45] Feb. 7, 1984

[54] APPARATUS AND METHOD FOR TEMPORARILY CONVERTING A TURBOCHARGED ENGINE TO A COMPRESSOR

[75] Inventor: Stanislav Jakuba, West Hartford, Conn.

[73] Assignee: The Jacobs Manufacturing Company, Bloomfield, Conn.

[21] Appl. No.: 256,093

[22] Filed: Apr. 21, 1981

[51] Int. Cl.³ .............................................. F02B 37/00
[52] U.S. Cl. ....................................... 60/600; 60/605; 417/380
[58] Field of Search ................. 60/600, 601, 605, 606; 123/198 F; 417/380

[56] References Cited

U.S. PATENT DOCUMENTS

| | | |
|---|---|---|
| 477,921 | 6/1892 | Andersen . |
| 1,013,528 | 1/1912 | Broderick . |
| 1,473,314 | 11/1923 | Poccia . |
| 1,485,803 | 3/1924 | Mount, Jr. et al. . |
| 1,738,121 | 12/1929 | Schramm . |
| 1,804,873 | 5/1931 | Hoffman . |
| 1,847,260 | 3/1932 | Pardee . |
| 1,992,400 | 2/1935 | Smith ................................ 122/195 |
| 2,400,581 | 5/1946 | Walker . |
| 2,627,371 | 2/1953 | Bernal . |
| 2,676,752 | 4/1954 | Ochel et al. . |
| 3,220,392 | 11/1965 | Cummins . |
| 3,365,014 | 1/1968 | Clingerman et al. ................ 180/54 |
| 3,426,523 | 2/1969 | Straub . |
| 3,500,635 | 3/1970 | Roper . |
| 3,570,240 | 3/1971 | Melchior ............................... 60/606 |
| 3,744,934 | 7/1973 | Ueno ................................... 417/237 |
| 3,958,900 | 5/1976 | Ueno ................................... 417/237 |
| 3,963,379 | 6/1976 | Ueno ................................... 417/237 |
| 4,054,156 | 10/1977 | Bensen ........................... 137/630.12 |
| 4,150,640 | 4/1979 | Egan ................................ 123/198 F |
| 4,150,651 | 4/1979 | Wade ............................... 123/198 F |

FOREIGN PATENT DOCUMENTS 2719668 11/1978 Fed. Rep. of Germany .
743219 1/1956 United Kingdom .................. 60/605

OTHER PUBLICATIONS

J. C. Grieg, "The Jacobs Engine Brake," *Retarders For Commercial Vehicles*, The Institution of Mechanical Engineers, pp. 23–30 (Jan. 3, 1974).

*Primary Examiner*—Douglas Hart
*Attorney, Agent, or Firm*—Stephen P. Gilbert

[57] ABSTRACT

Apparatus and method are provided for temporarily converting a turbocharged engine into a compressor that can provide compressed air for various uses, such as for pneumatic unloading of cargo. In a preferred embodiment a compression release engine brake is used to load the engine. That increases the turbocharger speed, thereby increasing the pressure and flow of air to the inlet manifold of the engine. Surplus boost air may then be withdrawn from the manifold.

8 Claims, 8 Drawing Figures

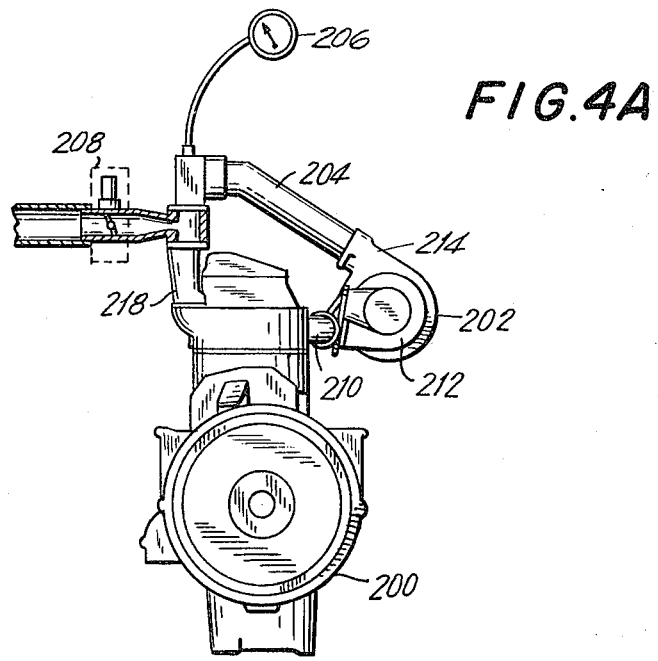
FIG.4A
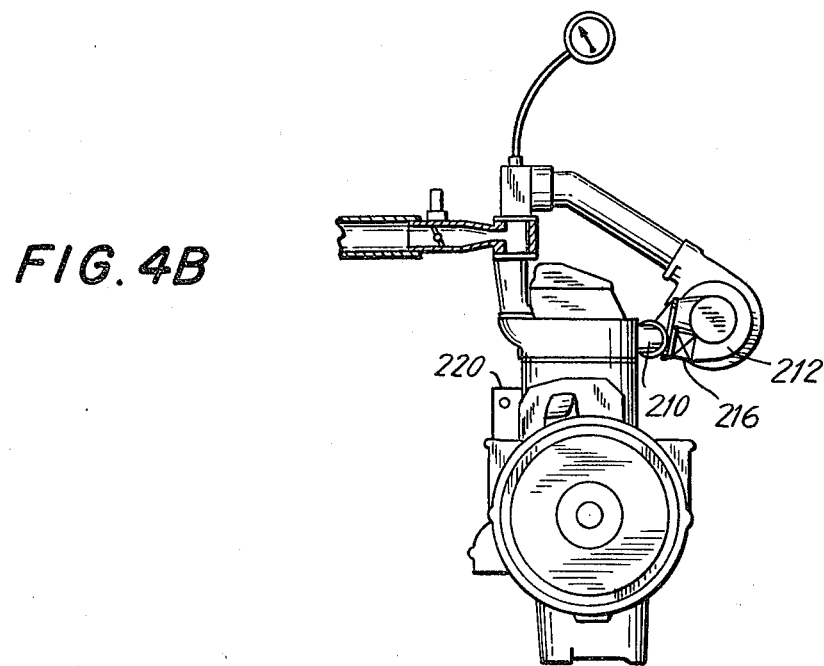
FIG.4B
FIG.3A
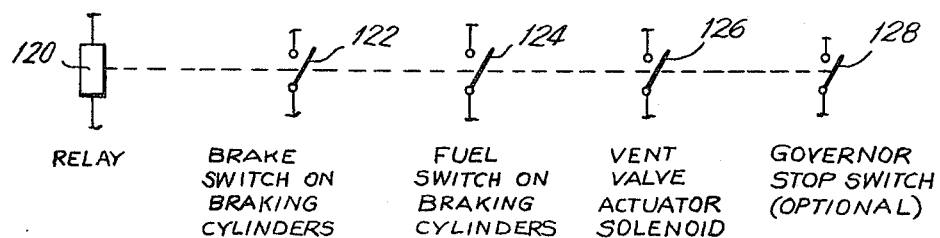

APPARATUS AND METHOD FOR TEMPORARILY CONVERTING A TURBOCHARGED ENGINE TO A COMPRESSOR

INTRODUCTION

This invention relates to the temporary conversion of a truck engine assembly to a compressor that produces surplus boost air available for use outside the engine.

Trucks sometimes require compressed air for various uses, such as, pneumatic unloading of certain cargoes (e.g., flour). Trucks requiring compressed air often have separate compressors and even separate engines for the compressors. However, that increases capital and operating costs.

In attempts to overcome that problem, numerous schemes for obtaining compressed air directly from truck engines have been proposed. See, for example, U.S. Pat. Nos. 1,013,528; 1,473,314; 1,485,803; 1,738,121; 1,804,873; 1,847,260; 1,992,400; 2,400,581; 2,627,371, 2,676,752; 3,365,014; 3,500,635; 3,958,900; and 3,963,379. In general, with those schemes the compressed air is obtained by halting fuel flow to some of the cylinders during operation and withdrawing the air from those cylinders at or near the end of the respective pistons' upstrokes.

Also known are compression release engine brakes in which the unrecovered work of compressing air in the cylinders slows the engine. See, for example, U.S. Pat. Nos. 3,220,392 and 3,426,523. The U.S. Pat. No. 3,220,392 relates to a compression release engine brake marketed under the trademark JAKE BRAKE® by the present assignee, The Jacobs Manufacturing Company.

The Jacobs Manufacturing Company has for years tested its compression release brakes in-house on samples of the three major classes of diesel engines, denominated for the purpose of this application by their respective fuel injection systems as Detroit Diesel, Cummins, and Bosch. In those tests, brakes were fitted on some of the engine cylinders, which cylinders were permanently modified so that no fuel could be fed to them. Sometimes it has been necessary to bleed the intake manifold to lower the manifold pressure.

SUMMARY OF THE INVENTION

It has now been discovered that by loading a turbocharged internal combustion engine of the compression ignition (diesel) type, compressed air may be obtained other than from the cylinders or discharge manifold.

Broadly, the apparatus of the invention comprises means to load the engine so as to increase the amount of fresh air being compressed by the turbocharger over and above that required for engine operation and means to withdraw a portion of the excess air entering the intake manifold from the turbocharger.

In a preferred embodiment, the apparatus comprises a compression release engine brake connected to at least one of the engine cylinders, means for temporarily activating the brake on some of the engine cylinders to load the engine (thereby increasing the flow of intake air from the turbocharger to the intake manifold), means for reducing the fuel flow to the braked cylinders, and means for withdrawing a portion of the air entering the intake manifold from the turbocharger.

The method of the present invention involves using the foregoing apparatus to load the engine and then withdrawing air entering the intake manifold from the turbocharger.

BRIEF DESCRIPTION OF THE DRAWINGS

To facilitate further description of the invention, the following drawings are provided in which:

FIG. 3A is a schematic of the control system used with the present invention;

FIGS. 4A and 4B are end views of an engine assembly modified in accordance with the present invention to produce low-pressure and medium-pressure compressed air, respectively;

DETAILED DESCRIPTION OF THE INVENTION

Figure 1:
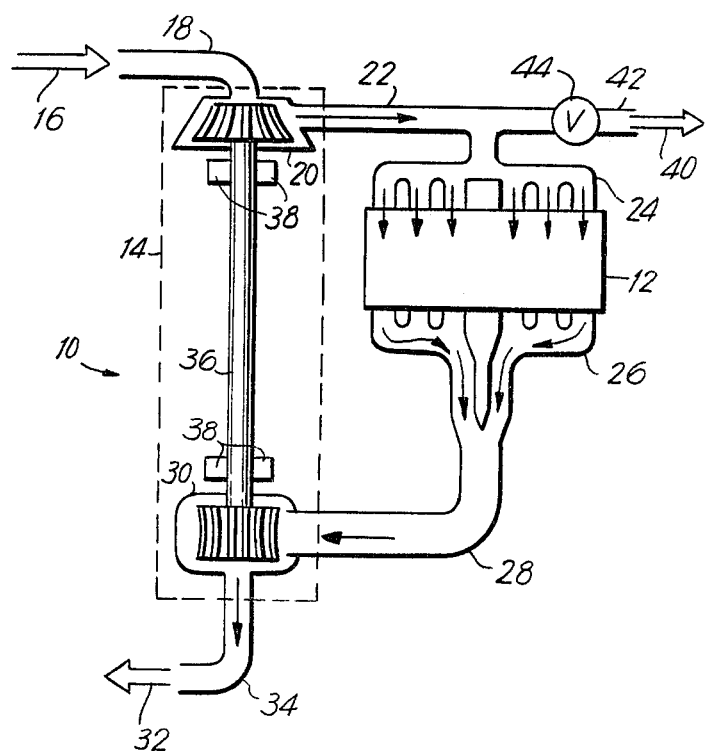
FIG. 1 shows an engine assembly comprising a six-cylinder internal combustion engine of the compression ignition type and its associated turbocharger.

In FIG. 1 air (indicated by arrow 16) is compressed by turbocharger 14 and delivered to internal combustion engine 12 where combustion occurs. The exhaust gases (indicated by arrow 32) leave the engine and flow to the exhaust system.

More specifically, air (arrow 16) enters engine assembly 10 through inlet 18. Compressor 20 of turbocharger 14 boosts air pressure and the air then passes into engine inlet manifold 24 via pipe 22. Combustion occurs in internal combustion engine 12. The hot exhaust gases leave through exhaust manifold 26, pass through pipe 28, power expansion turbine 30, and flow to the exhaust system through pipe 34 (the exhaust gases are indicated by arrow 32).

The rotation of turbine 30 is transmitted to compressor 20 by shaft 36, which is rotatably mounted on bearings 38. The more energy per unit time the exhaust gases lose powering turbine 30, the faster compressor 20 turns and the greater the fresh air flow through pipes 18 and 22.

By means of present invention, excess air is compressed by the turbocharger and some or all of the excess air may be drawn off through pipe 42 and valve 44 to be used outside the engine (for example, to unload cargo) without adversely affecting engine performance. The withdrawn boost air is indicated by arrow 40.

Diesel engines are governed, that is, the maximum engine speed is set (typically at 2,100 rpm) and only as much fuel is fed to the engine as is necessary to maintain the idle speed when the vehicle is not moving. Accordingly, the present invention provides for loading the diesel engine so as to increase the engine power required to maintain the engine speed. The greater the loading, the greater the fuel flow rate and, consequently, the greater the flow rate of exhaust gases.

In a preferred embodiment a compression release engine brake is used to load the engine and, most preferably, the JAKE BRAKE® compression release engine brake is employed. However, in contrast to the usual braking scheme with such devices only some of the cylinders are braked when using the present invention. Desirably, half the cylinders are braked while the others are powered.

With the vehicle at rest, braking three of six cylinders with a compression release brake increases the total available energy in the exhaust gas flow, increases the turbocharger speed, and increases the flow through the compressor so that up to two-thirds of the air entering the intake manifold can be bled for use outside the engine, the precise fraction depending on the desired air pressure of the bled air. The amount of surplus air that can be bled also depends on the particular engine, turbocharger, and compression release brake employed. Some or all of the excess boost air, available typically at 20 to 40 psia (13.8 to 27.6 kPa absolute), may be withdrawn through pipe 42 and valve 44 (FIG. 1).

Figure 2:
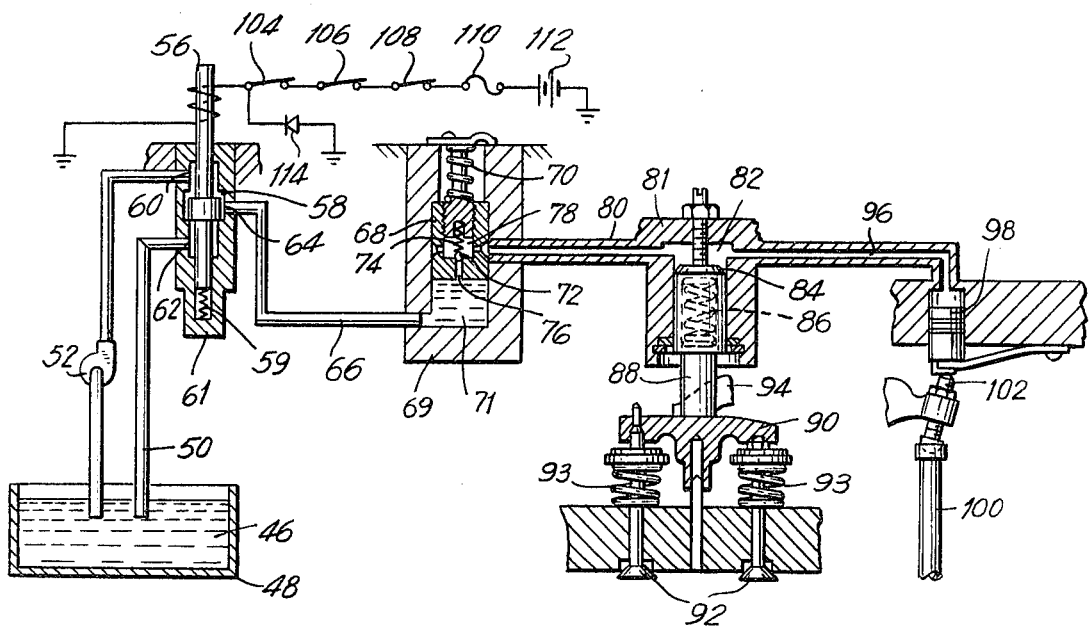
FIG. 2 is a diagram of a JAKE BRAKE® compression release engine brake.

FIG. 2 is a schematic of a JAKE BRAKE® compression release engine brake. Operation of this device is well-known (see, for example, U.S. Pat. No. 3,220,392 and *Retarders for Commercial Vehicles*, the Institution of Mechanical Engineers, Jan. 3, 1974, pages 23–30); however, its functioning will be briefly described here.

Under normal operation if the clutch is engaged, switch 106 is closed and if the accelerator pedal is not being depressed, switch 104 is closed. An operator wishing to use the brake then closes switch 108, thereby completing the circuit from ground through battery 112, fuse 110, the three switches, the coil around the core of switch 56 and back to ground (diode 114 is used to prolong switch life). The core of switch 56 then moves down, against the biasing force of spring 59 in valve housing 61, to the position shown.

Whenever the engine is running, chamber 58 is kept filled with oil by oil pump 52, which takes oil 46 from crankcase 48 and pumps the oil through pipe 54, out of discharge 60, and into chamber 58. With the core of valve 56 in the position shown, oil from chamber 58 flows into opening 64, through pipe 66, and into chamber 71 of control valve 69.

The pressure of the oil supplied by pump 52 forces valve member 68 up (as shown), against the biasing force of spring 70, so that the discharge opening of internal chamber 78 lines up with the opening for pipe 80. The oil pressure also forces check valve ball 72 to move up, against the biasing force of spring 74. That allows oil in chamber 71 to flow up through passageway 76, into chamber 78, through pipe 80, into chamber 82 of slave piston cylinder 81, and through pipe 96 to touch master piston 98. When the hydraulic system is completely filled with oil to piston 98, reverse flow is prevented by the reseating of check valve ball 72, which closes passageway 76.

When pushrod 100 is driven upwardly by the engine camshaft (not shown), adjusting screw 102 moves up and master piston 98 starts to force oil back along pipe 96 into chamber 82. Because passageway 76 is closed by ball 72, the oil from chamber 78 to piston 98 is trapped. As a result, the oil pushes piston 84 down, against the biasing force of spring 86. Rod 88, an extension of piston 84, moves down, causing member 90 to move down, thereby opening exhaust valves 92. The net result is that air compressed in the cylinders is released to the atmosphere and the energy of compression is not recovered. That slows the engine.

The exhaust valves are normally opened by exhaust rocker arm 94 (only a portion of which is shown), which is activated by the respective exhaust pushrod (not shown). When the brake-activating pushrod 100 moves down, spring 86 overcomes the reduced pressure of the oil in the control circuit from chamber 78 to piston 98 and exhaust valves 92 are closed by exhaust valve springs 93.

Each cylinder of the engine has its own slave and master pistons. If the engine does not have fuel injector pushrods, a different pushrod for one cylinder having the required timing is utilized to move the master piston for a second cylinder. For example, with a Bosch-type system the exhaust pushrod of cylinder 1 could be used to activate the master piston of the exhaust brake on cylinder 3.

When braking action is no longer needed and the operator opens braking switch 108 or depresses the accelerator pedal (opening switch 104), or if the clutch is disengaged (opening switch 106), the electrical control circuit opens and the core of switch 56 is pushed up by spring 59. That prevents oil from pump 52 from entering chamber 58. Additionally, oil is free to drain back from pipe 66, through opening 64, into the bottom part of chamber 58, through opening 62, into pipe 50, and back to crankcase 48. That relieves the upward pressure on slidable member 68 in control valve 69 and spring 70 forces member 68 down, thereby freeing the oil trapped from chamber 78 to master piston 98. Accordingly, some of that oil flows back towards crankcase 48 and upward movement of pushrod 100 no longer can force slave piston 84 down.

Normally, the brake is used on all cylinders of an engine and, as explained above, if the accelerator pedal is depressed, the brake does not operate (switch 104 will be open). However, with the present invention, only some (usually half) of the cylinders are braked and fuel is required for powering those cylinders not braked. Thus, a new electrical control circuit is required for operating the brake on only some of the cylinders and reducing fuel flow to them.

The new circuit is shown in FIG. 3A. When, for example, the vehicle is stationary with the engine idling and compressed air is needed, the operator depresses a button or flips a switch (not shown) which energizes relay 120. That, in turn, closes brake switches 122 and fuel switches 124 for those cylinders that will perform the braking, i.e., loading of the engine. Closing of switches 122 and 124 energizes the brake on each braking cylinder and halts or substantially reduces the fuel flow to each such cylinder. Additionally, the closing of relay 120 energizes vent valve actuator solenoid 126, which opens valve 44 (FIG. 1) so that the surplus boost air can be drawn off, and it energizes governor stop 128, is present, to allow higher engine speed.

Reducing the flow of fuel to the braking cylinders is accomplished in a different manner for each of the three major types of diesel engines. FIG. 3B schematically shows the equipment used with engines having positive displacement unit injector fuel systems, commonly known as the Detroit Diesel type. As is well-known, on this type of six-cylinder engine, for each of the two sets of three cylinders a governor rod is rotatably connected to a crank at the end of a shaft and the shaft is functionally connected to the three injectors. The rotation of the crank and the shaft is controlled by the back and forth movement of the control rod.

FIG. 3B shows that the standard governor rod for one set of cylinders is replaced by air cylinder 132 with piston 133 and spring 136 and a telescoping rod comprising sections 138 and 139. Additionally, a pneumatic control circuit is added. During normal operation, spring 140 biases deactivated solenoid valve 130 to the right and air from source 131 flows through tubing 142 to air cylinder 132, forcing piston 133 and section 138 out (to the left). The rod and piston are designed so that when the section 138 is extended by pressurization of the air cylinder, the rod has the same length as the original rod. Thus, the fuel system operates as if the modification for the present invention had not been made.

However, when fuel switch 124 is closed (FIG. 3A) because the present invention is to be utilized, solenoid valve 130 moves to the left. That prevents control air from passing to air cylinder 132 and allows air in cylinder 132 to vent through port 144 in the solenoid valve. Without the extension of the rod caused by air cylinder 132, spring 136 expands and allows clockwise rotation of crank 134 (caused by spring 137) to half fuel flow to the one set of three engine cylinders being braked. Crank 134 rotates on member 147 until stop 146 hits stop member 148. Rod section 138 slides in a slot-and-pin arrangement on crank 134 (pin 141 and slot member 149), permitting unobstructed operation of the governor (not shown).

Figure 3D:
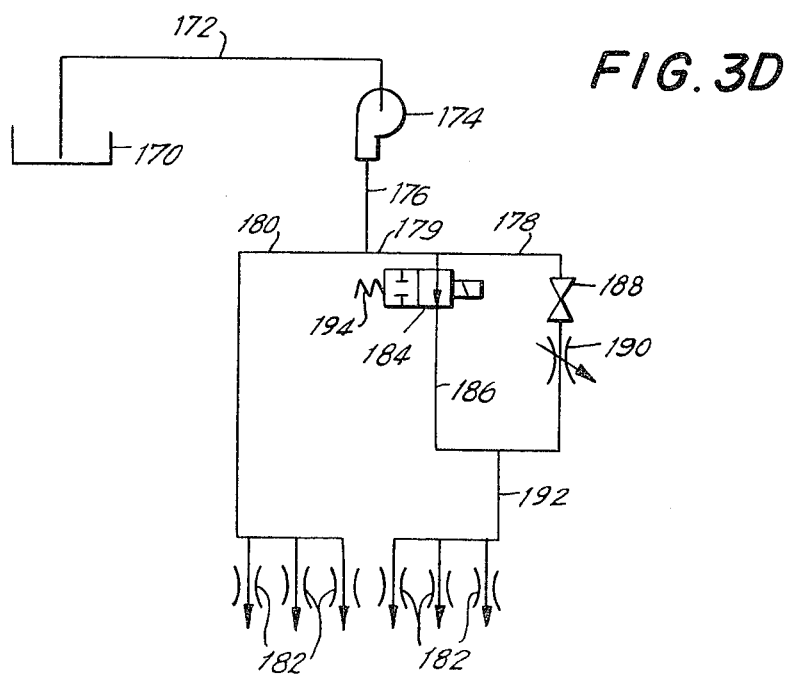
FIGS. 3B, 3C, and 3D are schematics of the fuel system modification in accordance with the present invention required for the three major classes of truck diesel engines (Detroit Diesel-type, Bosch-type, and Cummins-type, respectively)
Figure 3B:
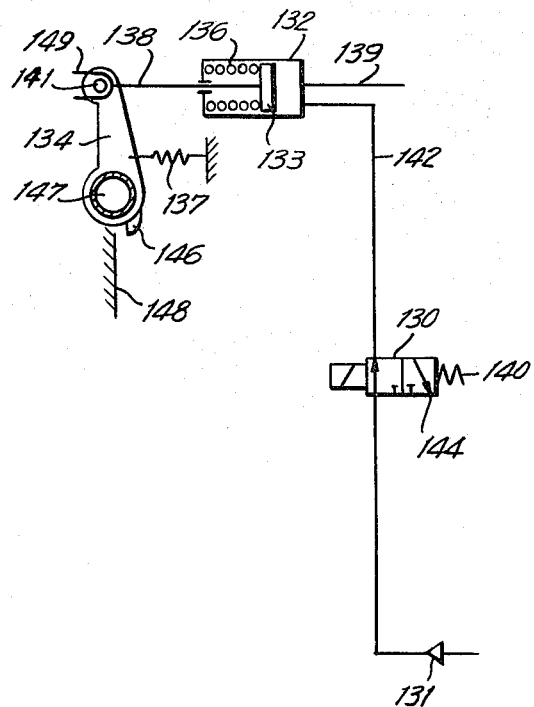
Figure 3C:
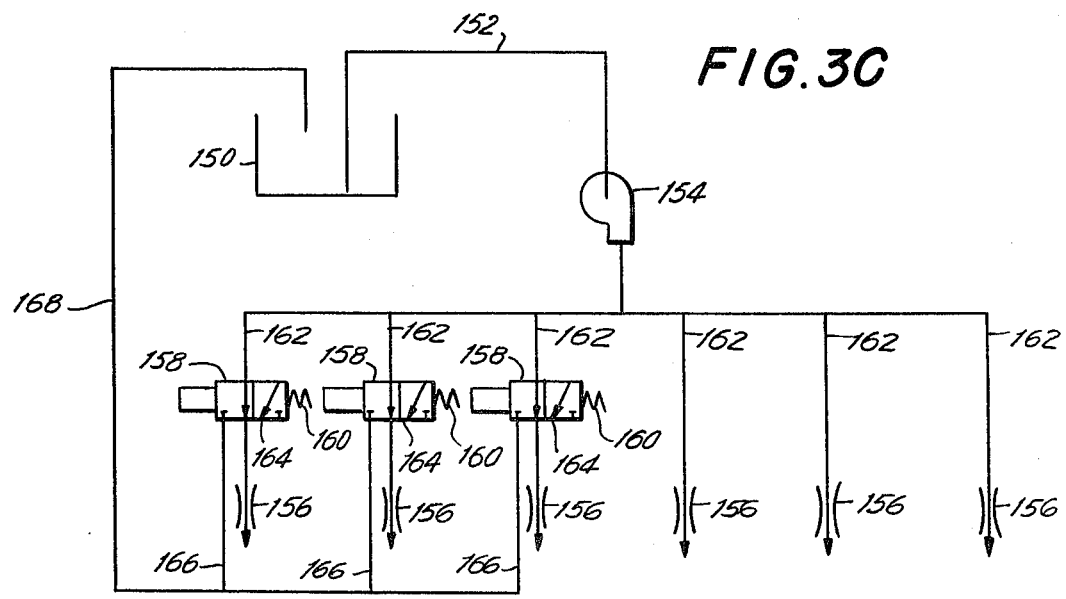

FIG. 3C schematically shows means in accordance with the present invention for reducing fuel flow to the braking cylinders in engines having jerk pump injector fuel systems, commonly known as the Bosch type. With this type of engine, during normal operation fuel flows from tank 150, through line 152, through pump 154, and through each of six lines 162 to each of six injectors 156.

With the modified fuel system, when relay 120 is energized, closing fuel switch 124 (FIG. 3A), solenoid valves 158 are energized, causing them to move to the left, against the biasing force of springs 160. That aligns the three valve ports 164 with the three fuel dump lines 166 and traps the residual pressure in the lines to injectors 156. As a result, fuel entering the three left lines 162 will flow through lines 166 and line 168, back to tank 150, rather than to the three left fuel injectors 156. When relay 120 is deactivated, switch 124 opens (FIG. 3A), and the three solenoids of valves 158 are deenergized. The three springs 160 then pull valves 158 to the right and fuel flow to the three left injectors 156 recommences.

FIG. 3D schematically shows means in accordance with the present invention for reducing fuel flow to the braking cylinders in engines having pressure-timed metering unit injector fuel systems, commonly known as the Cummins type. During normal operation fuel from tank 170 flows through line 172 and is pumped by pump 174 through line 176, which splits into lines 179 and 180. Fuel in line 180 flows directly to the three left injectors 182, and fuel in line 179 flows through solenoid valve 184, line 186, and line 192 to the three right injectors 182.

When relay 120 is energized by a truck operator wishing to obtain compressed air in accordance with the present invention, the closing of fuel switch 124 (FIG. 3A) causes the solenoid of valve 184 to move the valve to the right, against the biasing force of spring 194. The left portion of valve 184 blocks the fuel flow through line 186, and the fuel entering line 179 must flow through line 178. Pressure regulator 188 regulates the inlet pressure to restriction orifice 190 and the orifice substantially reduces but does not completely halt the flow of fuel through line 192 to the three right injectors 182. A small flow of fuel to the braking cylinders is required to lubricate the plungers in the injectors.

When relay 120 is deenergized, fuel switch 124 opens (FIG. 3A), the solenoid of valve 184 is deenergized, and spring 194 pulls valve 184 back to the position shown in FIG. 3D, thereby allowing the normal flow of fuel through line 186 to resume.

FIGS. 4A and 4B are end views of diesel engines modified in accordance with the present invention. Turning first to FIG. 4A and referring also to FIG. 1, exhaust gas from engine 200 flows out through pipe 210 (analogous to pipe 28 in FIG. 1) to expansion turbine 212 of turbocharger 202. As explained above, rotation of turbine 212 causes compressor 214 to turn and blow fresh air through crossover 204 to inlet manifold 218. Pressure gauge 206 indicates the pressure in the inlet manifold, and vent valve and actuator 208 (controlled by switch 126—see FIG. 3A) correspond to valve 44 of FIG. 1 and permit withdrawal of surplus boost air.

FIG. 4B is the same as FIG. 4A except that means 216 (between exhaust gas pipe 210 and expansion turbine 212) and means 220 (to raise the governed speed of the engine) have been added to increase the turbine speed. Increasing the turbine speed increases the amount of air blown by the turbocharger compressor and increases the compressor's discharge pressure. Means 220 is an engine governed speed adjustor. Any means capable of increasing the turbocharger speed (such as an engine governed speed adjustor, afterburner, or a second turbocharger in tandem with the first) may be used to increase the amount and/or delivery pressure of the surplus boost air withdrawn from the system.

Variations and modifications in this invention will be obvious to those skilled in the art and the claims are intended to cover all variations and modifications that fall within the true spirit and scope of the invention.

I claim:

1. Apparatus for providing compressed air from a turbocharged internal combustion engine of a stationary vehicle, said engine being of the compression ignition type and having a plurality of cylinders and intake and discharge manifolds; said apparatus comprising:
   (a) a compression release engine brake connected to at least one of the engine cylinders;
   (b) means for temporarily activating the compression release engine brake on some of the engine cylinders to load the engine, thereby to increase the flow of fresh air into the turbocharger over and above that required for engine operation;
   (c) means for temporarily reducing the flow of fuel to the braked cylinders; and
   (d) means for withdrawing from the turbocharger-intake manifold fluid circuit at least some of the excess air compressed by the turbocharger.

2. The apparatus of claim 1 wherein the fuel system of the engine is of the jerk pump injector type.

3. The apparatus of claim 1 wherein the fuel system of the engine is of the pressure-timed metering unit injector type.

4. The apparatus of claim 1 wherein the fuel system of the engine is of the positive displacement unit injector type.

5. A method of providing compressed air from a turbocharged engine of a stationary vehicle, the engine being of the compression ignition type and having a plurality of cylinders and intake and discharge manifolds, the vehicle having:
   (a) a compression release engine brake connected to at least one of the engine cylinders;
   (b) means for temporarily activating the compression release engine brake on some of the engine cylinders to load the engine, thereby to increase the flow of fresh air into the turbocharger over and above that required for engine operation;
(c) means for temporarily reducing the flow of fuel to the braked cylinders; and
(d) means for withdrawing from the turbocharger-intake manifold fluid circuit at least some of the excess air compressed by the turbocharger;

said method comprising:
(a) temporarily activating the compression release engine brake on some of the engine cylinders to load the engine, thereby increasing the flow of fresh air into the turbocharger over and above that required for engine operation;
(b) temporarily reducing the flow of fuel to the one or more braked cylinders; and
(c) withdrawing from the turbocharger-intake manifold fluid circuit at least some of the excess air compressed by the turbocharger.

6. The method of claim 5 wherein the fuel system of the engine is of the jerk pump injector type.

7. The method of claim 5 wherein the fuel system of the engine is of the pressure-timed metering unit injector type.

8. The method of claim 5 wherein the fuel system of the engine is of the positive displacement unit injector type.

* * * * *

UNITED STATES PATENT AND TRADEMARK OFFICE
CERTIFICATE OF CORRECTION

PATENT NO. : 4,429,532

DATED : February 7, 1984

INVENTOR(S) : Stanislav Jakuba

It is certified that error appears in the above—identified patent and that said Letters Patent is hereby corrected as shown below:

At column 5, line 15, "half" should be --halt--.

Signed and Sealed this

Twenty-sixth Day of February 1985

[SEAL]

Attest:

DONALD J. QUIGG

Attesting Officer     Acting Commissioner of Patents and Trademarks